United States Patent [19]

Hirota

[11] Patent Number: 4,644,372

[45] Date of Patent: Feb. 17, 1987

[54] INK JET PRINTER

[75] Inventor: Tetsuro Hirota, Zama, Japan

[73] Assignee: Ricoh Company, Ltd., Tokyo, Japan

[21] Appl. No.: 755,174

[22] Filed: Jul. 15, 1985

[30] Foreign Application Priority Data

Jul. 16, 1984 [JP] Japan .............................. 59-147088
Jul. 16, 1984 [JP] Japan .............................. 59-147089

[51] Int. Cl.[4] .............................................. G01D 15/28

[52] U.S. Cl. ...................................... 346/138; 346/75; 400/708; 400/712

[58] Field of Search .................. 346/75, 138; 400/708, 400/712

[56] References Cited

U.S. PATENT DOCUMENTS

| | | | |
|---|---|---|---|
| 4,014,427 | 3/1977 | Rines | 400/708 |
| 4,101,018 | 7/1978 | Sokolowski | 400/582 X |
| 4,435,770 | 3/1984 | Horike et al. | 346/75 |
| 4,452,136 | 6/1984 | Boynton et al. | 101/93.05 X |

*Primary Examiner*—E. A. Goldberg
*Assistant Examiner*—Gerald E. Preston
*Attorney, Agent, or Firm*—Mason, Fenwick & Lawrence

[57] ABSTRACT

A printer which utilizes a charge controlled ink jet head is disclosed. A platen and its surrounding parts will be marred if the ink jet head is operated when there is no paper around the platen. Thus, the detection of a paper is of importance, and accordingly, a paper sensor is disposed near the platen. To prevent the sensor from being contaminated by the ink, the paper sensor is disposed rearward of the platen, as viewed from the ink jet head. The presence or absence of a record paper in front of the ink jet head is determined by a microprocessor which responds to a detection signal from the paper sensor and the amount of rotation which the platen has undergone since the detection of a paper by the sensor. If the printing operation is in pause over a given time interval at the end thereof or after the initiation of the projection of an ink jet, the projection of the ink jet is interrupted in order to reduce evaporation of solvent from the ink. It takes a relatively long time from the initiation of the projection of an ink jet until the recording operation is enabled. For this reason, a reset switch is provided to permit the projection of an ink jet to be started before a print command is supplied. The operator may operate the reset switch to initiate the projection of the ink jet at a time earlier than the print command.

22 Claims, 14 Drawing Figures

INK JET PRINTER

FIELD OF THE INVENTION

The invention relates to the paper detection and paper feed control in a printer, and in particular, to an ink jet printer and an associated paper detection and paper feed control therein. The invention also relates to an ink jet printer in which a jet of pressurized ink is projected from a nozzle, and the projected ink is selectively charged to a given level and the charged ink is subject to deflection by a deflecting electric field, and in particular, to a control of ink jet projection.

BACKGROUND OF THE INVENTION

In an ordinary serial printer, a print head is located opposite to a circular platen and is disposed for movement back and forth along a platen shaft. A printing paper is supplied to a paper feed mechanism disposed around the platen in a manner such that its leading edge is disposed against the back surface of the platen which is opposite from the print head so that it is fed together with the platen as the latter rotates to a position which is located opposite to the print head. Accordingly, a paper sensor which is used to detect the leading and the trailing edge of the paper cannot be disposed in a region forwardly of the front platen surface across which the print head moves back and forth. Certain type of ink jet printers are disclosed in Japanese Laid-Open Utility Model Applications No. 60,505/1979 and No. 17,574/1980, for example. In such instance, the usual practice is to dispose the paper sensor rearwardly of the platen since the areas around the platen may be contaminated by ink sprays from the ink jet.

When the paper sensor is located rearward of the platen, there exists an increased spacing between the print position or the location of the print head and the location where the presence of a paper is detected by the paper sensor, and hence a signal from the paper sensor cannot be directly used in providing an accurate control over paper feed or recording operation. To illustrate, it is possible that the paper sensor has detected the presence of a paper, but there is no paper present at the location where a recording operation by the print head should take place. Conversely, it is also possible that the paper may be present at the location for recording by the print head even though the paper sensor does not detect the presence of a paper. A similar problem occurs when automatically loading a printing paper around the platen.

In an ink jet printer of charge controlled type, a jet of ink is continuously projected from a nozzle, and substantially all of the ink which has not been caused to impinge upon a recording paper is recovered by a gutter to be returned to an ink reservoir. Such portion of the ink which is not directed toward the recording paper flies through the air, after being projected through the nozzle and before impinging upon the gutter, and experiences an evaporation of a solvent to result in an increased ink viscosity. Also, oxidation may cause a modification or degradation in the ink quality.

To reduce a change in the ink viscosity, or a modification and/or degradation in the ink quality, it is proposed in Japanese Patent Publication No. 36,863/1982 that when data to be printed ceases to be supplied for a given time interval, the drive of a pump is interrupted and a solenoid valve is switched to establish a direct communication between the nozzle and an ink reservoir, thus ceasing the projection of an ink jet and returning the ink from the head to the reservoir.

However, in a printer, there is a frequent occurrence that a printing operation must be initiated immediately after a given time interval in which the data to be printed ceases to be supplied. The projection of an ink jet is preferably continued even though the data to be printed ceases to be supplied over a given time interval, if a time-over occurs during the time that a line feed operation is repeated or as a result of retarded page-out rate. If the projection of an ink jet is once interrupted, the re-initiation of the projection of an ink jet is followed by a standby time during which an ink pressure, an ink temperature and other parameters are monitored for a given time interval until they assume given values, whereupon the retrieval of phase or a control of deflection is made, all of which contribute to retarding the initiation of a recording operation. Viewed differently, a host unit such as a computer, a word processor or a scanner which supplies data to be printed to the printer produces an initializing command which indicates the re-initiation of a printing operation, and the printer initiates the projection of an ink jet in response thereto. After a standby time of a given length, the printer performs a phase retrieval and a deflection control before it transmits a ready signal to the host unit, clearing a busy signal which has been transmitted to the host unit, thus initiating a control over the printing operation. Thus, tasks increase on the part of the host unit. Also, the printer must perform an initializing control, similar to that during an initial warm-up period when the power is turned on, thus also increasing the tasks on the part of the printer. If it is attempted to allow a rapid rise time control, especially for the interruption of an ink jet which occurs as a result of the cessation of data to be printed, this increases the program on the part of the printer, increasing the control tasks.

It will be seen that the host unit delivers an initializing signal to the printer only after the transfer of data to be printed is possible, and hence as viewed from the host side, it must wait for a standby time of a substantial length since the condition on the part of the host unit permits a printing operation. Where an operator has a knowledge about the condition of the host unit or is operating it, the operator can predict the time when the transfer of data to be printed from the host unit is possible. Accordingly, it is preferred that the ink jet printer be previously activated by a manual command to establish a condition in which an ink jet is available. In such instance, a signal which indicates the interruption of an ink jet, a signal which indicates that the projection of an ink jet is being interrupted, and also a signal that the re-initiation of an ink jet has enabled a printing operation be preferably produced.

On the other hand, the ink viscosity tends to increase during the time the ink jet is being projected, thus causing a modification or degradation in the ink quality. Accordingly, it is preferable that an ink in a circulating system be discarded in small quantities in order to expedite the consumption of the ink.

It will be understood that a rise time which is required during the standby mode which immediately follows the momentary interruption of the ink jet can be reduced as compared with the rise time required immediately after the power turn-on of the printer, and it is desired that such rise time be minimized. Also when the printer is conveyed, air bubbles will be mixed with the ink, requiring an ink aging projection which must be continued over a relatively long period. It will then be noted that the interruption of an ink jet as a result of the cessation of the data to be printed causes such aging projection to be interrupted, and hence a wearisome operation may be required to provide an initializing command in response to each interruption of the ink jet. Alternatively, a separate approach must be provided.

SUMMARY OF THE INVENTION

The invention has for its first object to provide an accurate control over paper feed and printing operation while a paper sensor is disposed rearward of a platen in a printer, and has for its second object to enable an accurate automatic paper loading with the use of such a paper sensor.

The above objects are accomplished in accordance with the invention by providing paper sensor means located between a paper inlet of guide means and a second roller located away from the inlet in a direction to feed the paper for detecting the presence or absence of a paper, and print controller means for calculating a first amount of paper feed since the paper sensor means has changed from detecting the absence to detecting the presence of a paper, for calculating a second amount of paper feed since the paper sensor means has changed from detecting the presence to detecting the absence of a paper, and for energizing recording and drive means in accordance with data to be printed and a control command, commencing from the time when the first calculated amount has reached a first given value until the second calculated amount reaches a second given value.

With this arrangement, a single paper sensor may be used to assure that a printing operation takes place accurately only over a desired area on a recording paper. Also, an accurate loading of a recording paper around a platen as well as an accurate feed operation can be assured.

In a preferred embodiment of the invention, the print controller means is operative to energize the drive means in response to an automatic paper load signal when the paper sensor means detects the absence of a paper, and to deenergize the drive means when the first calculated amount of paper feed reaches the first given value since the paper sensor means has changed from detecting the absence to detecting the presence of a paper until a paper feed signal is oncoming next.

With this arrangement, when a paper is loaded into the guide means and a paper loading command switch is operated to instruct a paper feed operation, the paper feed operation is atuomatically stopped when the leading edge of the paper has reached a given record position or a first given position as hereinafter referred to, whereby the machine is in a print standby condition. This paper feed operation does not take place in response to a paper feed command under the condition that the paper sensor has detected the presence of a paper (which is already loaded), thus preventing an inadvertent paper jamming.

In a preferred embodiment of the invention, the print controller means is also operative to stop a record operation when the second calculated amount has exceeded the second given value, whereupon it activates alarm means. With this arrangement, it is possible to inform to an operator that the trailing edge of the record paper has reached a print terminating position, which is referred to hereinafter as a second given position. In this manner, the paper may be removed and the next sheet of paper may be readily and accurately loaded.

Also, in the preferred embodiment of the invention, the print controller means is operative to energize the paper feed mechanism for a line feed, a page-out and a paper loading in response to the operation of corresponding command switches mounted on an operating board.

Accordingly, a paper feed operation can also be controlled in response to a command from the operating board of the printer, in addition to commands from a host or data processor such as a computer, a word procssor or an image reader, enabling a paper loading, a paper feed or paper removal as required.

In the preferred embodiment of the invention, the print controller means is not responsive to any operation of these command switches on the operating board when data to be printed and a control command are being supplied and when a corresponding recording or paper feed operation is being conducted.

This eliminates the possibility of performing an erroneous paper processing in response to an inadvertent operation of the operating board to mar the platen or to nullify a control which is based on a command from the host unit when a desired print control is being executed or going to be executed in response to a command or data to be printed which is supplied from the host unit.

The invention has for its third object to reduce an increase in the viscosity of the ink or a modification or degradation in the ink quality and to minimize an interference of the interruption of the ink jet with the printing operation in an ink jet printer of charge controlled type.

The invention has for its fourth object to facilitate the re-initiation by an operator of an ink jet which has been once interrupted to reduce an increased viscosity and a modification or degradation in the ink quality in an ink jet printer.

The invention has for its fifth object to provide a signal indicating the interruption of an ink jet, which causes an increased in the ink viscosity and a modification or degradation in the ink quality to be reduced, as well as a signal indicating the duration of such interruption.

The invention has for its sixth object to refresh the ink by utilizing the interruption of an ink jet which reduces an increase in the ink viscosity and a modification or degradation in the ink quality.

The invention has for its seventh object to reduce the rise time during the standby mode which follows a temporary interruption of the ink jet as compared with the corresponding rise time which immediately follows the power turn-on of the printer.

The invention has for its eighth object to prevent an interruption of an aging ink projection.

The third object is achieved in accordance with the invention by providing a print controller for an ink jet printer which is effective to drive and cease to a drive pump, energize and deenergize a solenoid valve assembly, control the application of a charging voltage to a charging electrode and also control a feed operation which is effected by a recording paper feed mechanism. When any print command such as a print command, line feed command or a page-out command is not supplied over a given time interval, the print controller operates to stop the pump, and renders the solenoid valve assembly in a condition in which the supply of an ink to an ink projecting head ceases. The print controller is maintains a temperature controller operative during the projection of an ink jet. When it receives a reset signal while it has interrupted the ink jet, it sets up a pump run and also sets up the solenoid valve assembly for an ink supply to the ink projecting head.

With this arrangement, the projection of an ink jet is interrupted when there is no oncoming signal which sets up a print operation over a given time interval, such as a line feed command, a page-out command as well as a print command including data to be printed. Accordingly, the possibility that the projection of an ink jet is interrupted when a print operation is intended to begin is reduced, reducing the likelihood that the recording operation is retarded. Since a control over the ink temperature is continued, the length of time which is required until the ink jet is stabilized upon re-initiation of an ink jet is reduced correspondingly, accelerating the initiation of a recording operation.

The fourth object mentioned above is achieved in a preferred embodiment of the invention by providing a reset signal in response to an operation of a manual reset switch, and allowing the print controller to respond thereto by initiating the projection of an ink jet.

With this arrangement, assuming that the host unit comprises a word processor, the operator may refer to an indication of the status of the printer when a print-out is scheduled within a reduced length of time. When the printer status is indicated as an interruption of the ink jet, the operator may operate the reset switch to initiate the projection of an ink jet. Accordingly, any desired print-out operation can be initiated immediately.

The fifth object described above is achieved in a preferred embodiment of the invention by causing the print controller to energize an acoustical device temporarily upon interruption of the ink jet and to energize a light emitting element continuously for flashing operation as long as the ink jet is interrupted. With this arrangement, the interruption of the ink jet is informed to the operator by a sound produced by the acoustical device, and if a print-out operation is scheduled within a short length of time, he may operate the reset switch to re-initiate the projection of an ink jet. As long as the projection of the ink jet is interrupted, the light emitting element permits a recognition of such condition, and hence if a print-operation is scheduled to occur within a short length of time, the operator may immediately operate the reset switch to re-initiate the projection of the ink jet. If the interruption of the ink jet may be allowed to continue, it is unnecessary to turn the power source of the printer off.

The sixth object described above is achieved in a preferred embodiment of the invention by constituting the solenoid valve assembly as a switching valve which when energized establishes a communication between the pump and the ink jet projecting head and interrupts a communication between the pump and the head on one hand and a waste vessel and which when deenergized establishes a communication between the head and the waste vessel and interrupts the communication between the head and the waste vessel on one hand and the pump on the other. The print controller deenergizes the solenoid valve assembly when the ink jet is interrupted. An ink receiver is mounted on a carriage on which the head is mounted, and comprises a gutter which captures ink particles moving on a given track, and a deflection detecting, ink trap for capturing ink particles which missed the gutter when the carriage has moved out of recording positions. The ink which is recovered by the gutter is passed to an ink passage leading to the inn jet projecting head while the ink recovered by the ink trap is returned to the waste vessel. The ink trap comprises an opening which allows all of the ink which missed the gutter to be advanced thereinto, and a charge detecting electrode disposed within the opening. The print controller is operative to drive the carriage to a given location which is out of the recording positions, at a given time interval as long as the ink jet continues, thereby effecting an adjustment of the amount of deflection based on a condition detected by the charge detecting electrode and effecting an ink projection for purpose of discarding it for a given time interval.

With this arrangement, the ink from the head flows to the waste vessel to be removed from the ink circulating system when the projection of an ink jet is interrupted. The ink projected during the adjustment of the amount of deflection upon initiation of an ink jet as well as the ink projected for purpose of discarding it are both removed out of the ink circulating system. A corresponding reduction in the ink quality is replenished by supplying a fresh ink from an ink cartridge into the ink circulating system, thus refreshing the ink.

The seventh object described above is achieved in a preferred embodiment of the invention by causing the print controller to set up a given length of time for the standby mode when the projection of an ink jet is initiated immediately upon turning on the power. The print controller sets up a reduced length of time for the standby mode when the ink jet is subsequently interrupted. When such time length has passed, the print controller begins the application of a charging voltage to the charging electrode.

The eighth object described above is achieved in a preferred embodiment of the invention by causing the print controller to continue the projection of the ink jet as long as a given switch assumes a given status if other conditions enable the ink jet to be interrupted. Thus, this switch may be operated during the aging projection to prevent the ink jet from being interrupted.

Other object and features of the invention will become apparent from the following description of an embodiment thereof with reference to the drawings.

DESCRIPTION OF PREFERRED EMBODIMENT

Figure 1A:
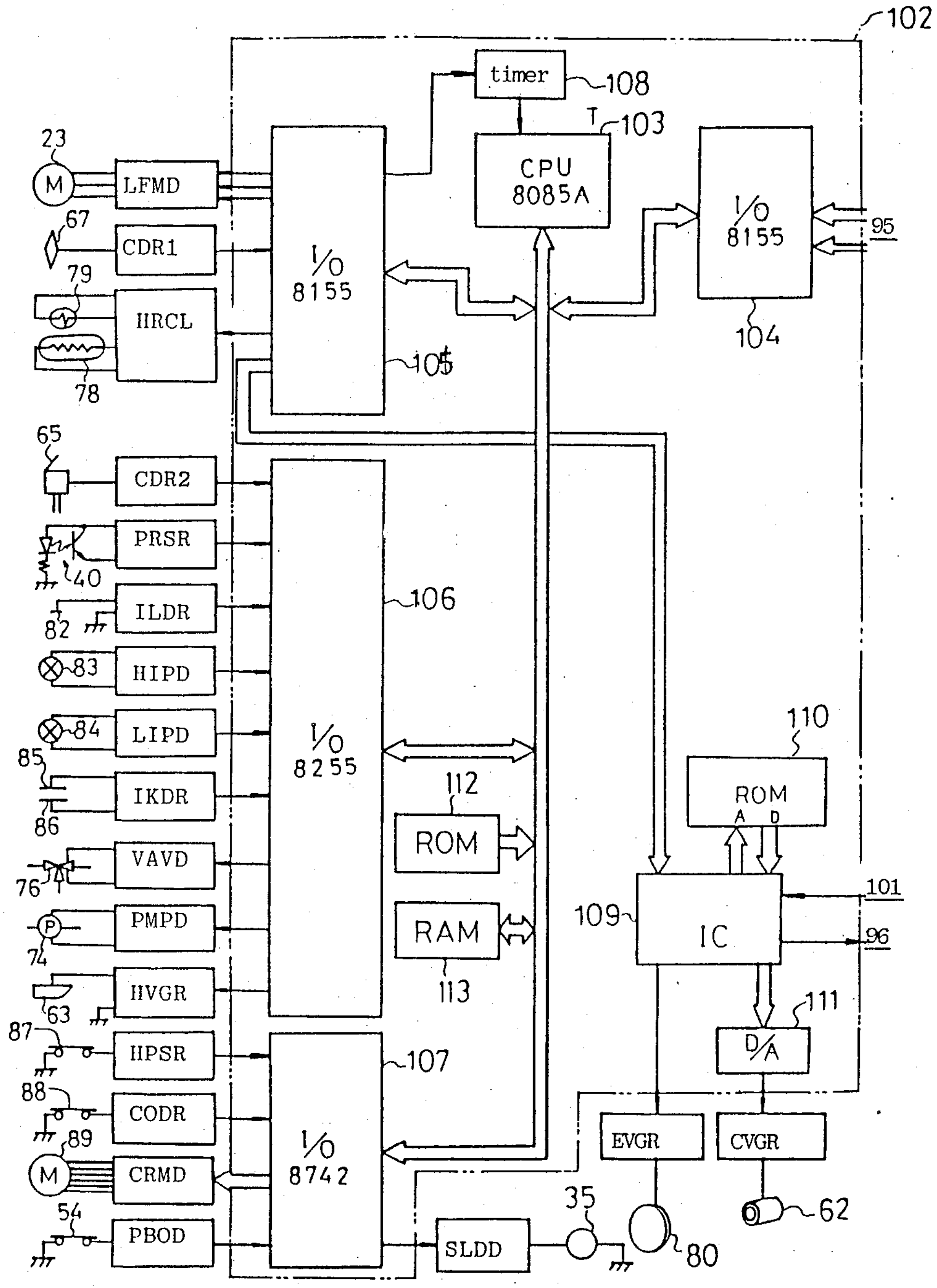
FIG. 1*a* is a block diagram schematically illustrating a part of an electrical control for one embodiment of the invention.
Figure 1B:
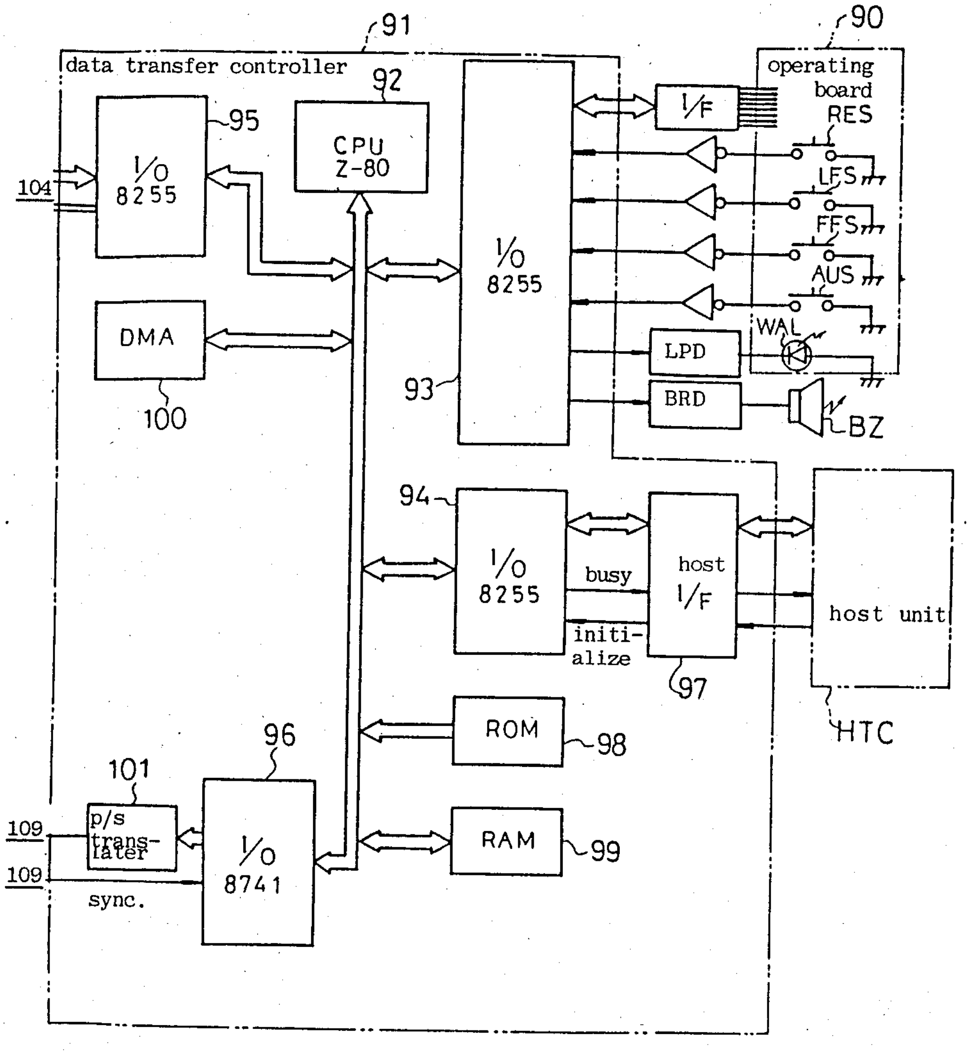
FIG. 1*b* is a block diagram schematically illustrating another part of the electrical control for the embodiment.

Referring to FIGS. 1*a* and 1*b*, there are shown various electrical components which are used in an embodiment of the invention. The embodiment is implemented as an ink jet printer which records an image based on print data which is supplied together with control signals from a host unit HTC which may comprise a computer, a word processor, a scanner or like data processor. The electrical control of the printer shown in FIGS. 1*a* and 1*b* generally comprises a data transfer controller 91 (FIG. 1*b*) and a print controller 102 (FIG. 1*a*) which is connected with the controller 91.

The data transfer controller 91 (FIG. 1*b*) comprises a microprocessor (hereafter referred to as CPU) 92, input/output units 93 to 96, a host interface 97, ROM 98, RAM 99, a parallel to serial translator which translates data from a parallel form into serial form, and a plurality of buses including an address bus, a data bus and a control bus. A host unit HTC is connected to the host interface 97 through a connector, not shown. An operating board 90 of the printer is connected to the input/output unit 93, which is also connected to a buzzer BZ.

Figure 2:
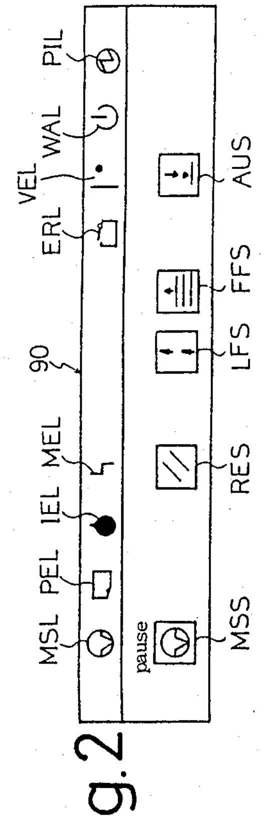
FIG. 2 is a plan view of an operating board used in the embodiment of FIGS. 1*a* and 1*b;*

The appearance of the operating board 90 is illustrated in FIG. 2. In the illustration of FIGS. 1*b* and 2, the following characters are used as abbreviations:

RES: reset switch
LFS: line feed switch
FFS: page-out switch
AUS: automatic loading switch
WAL: standby lamp (light emitting diode)
PIL: power supply indicator lamp
VEL: paper bail open indicator lamp
ERL: cover open indicator lamp
LPD: lamp driver
BRD: buzzer driver The print controller 102 (FIG. 1*a*) comprises CPU 103, input/output units 104 to 107, a timer 108, ROM 110 which stores data used to correct for a distortion in the charge, an integrating circuit 109 which calculates a correction to correct for a distortion of the charge, D/A converter 111, ROM 112 and RAM 113. Control data and control signals from the operating board 90 and the host unit HTC are supplied to the input/output unit 104 of the print controller 102 from the input/output unit 95 of the data transfer controller 91. Display data supplied to the operating board 90 is transmitted to the input/output unit 95 of the data transfer controller 91 from the input/output unit 104 of the print controller 102. Data to be printed is supplied to the calculation IC 109 of the print controller 102 through the parallel/serial translator 101 of the data transfer controller 91. The input/output units 105 to 107 and the calculation IC 109 of the print controller 102 are connected to a variety of drivers which energize or activate various electrical components relating to the operation of the ink jet printer and to signal processing circuits associated with various sensors which detect the status of these components, as illustrated in FIG. 1*a*. It should be understood that elements which are not directly related to the operation of the invention are omitted from illustration to preserve the clarity of the drawings.

The electrical components and sensors connected to the print controller 102 (FIG. 1*a*) will now be described. A line feed motor 23 is formed by a pulse motor which performs a paper feed operation. A charge detecting electrode 67 is mounted in an ink trap 66 which will be described later. When a charged ink particle impinges thereon, a signal indicating the presence of a charge is fed from a charge detector circuit to the print controller 102. The ink trap 66 may be an ink trap as disclosed in a pending U.S. patent application Ser. No. 700,024, filed Aug. 2, 1984 in the name of Ishikawa et al, or an ink trap disclosed in Japanese Laid-Open Patent Application No. 108,167/1983. An ink temperature sensor is indicated at 79 which is shown adjacent to an ink heater 78. During the time the print controller 102 provides an on control, the energization of the heater 78 is controlled by a heater control circuit so that the temperature detected by the sensor 79 is equal to a given value.

A gutter 65 formed by an electrical conductor is adapted to capture an ink which is not used in a printing operation, and is connected to a charge detector circuit. When an impingement of charged ink particles upon the conductor gutter occurs, the charge detector circuit provides a signal indicating the presence of a charge and feeds it to the print controller 102. A paper sensor 40 is disposed rearwardly of a platen, as will be further described later. A light signal received by the paper sensor is processed by a paper sensor circuit, which provides a signal indicating the presence or absence of a paper, which is fed to the print controller 102. An electrode 82 is disposed within an ink reservoir to detect an ink level. When the electrode 82 is contacted by the liquid ink, a signal indicating the presence of an ink is fed by an ink level detector circuit to the print controller 102. Obviously, when the electrode 82 is not contacted by the ink liquid, the detector circuit supplies a signal indicating the absence of the ink.

A pair of pressure sensors 82 and 83 detects the ink pressure within an accumulator. A high ink pressure detector circuit feeds an overpressure signal to the print controller 102 when the ink pressure within the accumulator exceeds a given value. Similarly, a low ink pressure detector circuit feeds an underpressure signal to the print controller 102 when the ink pressure within the accumulator is less than a different given value.

A pair of electrodes 85 and 86 are disposed on the bottom of the carriage at locations where the ink tends to accumulate. When a flow communication between the both electrodes occurs, an ink detector circuit feeds a signal indicating the occurrence of an ink leakage to the print controller 102.

The energization of a solenoid-operated switching valve 76 is controlled by a valve driver in response to a command from the print controller 102. When energized, the valve establishes a communication between the accumulator and the ink jet projecting head and interrupts the communication between the accumulator and the head on one hand and the waste vessel on the other hand. When deenergized, it establishes a communication between the head and the waste vessel and interrupts the communication between the head and the waste vessel on one hand and the accumulator on the other.

A pressure pump 75 withdraws an ink from the ink reservoir and feeds the ink under the pressure to the accumulator. It is energized by a pump driver as long as the print controller 102 delivers an on command.

One of deflecting electrodes, to which a high voltage is applied is shown at 63. As long as the print controller 102 delivers a deflection voltage on command, a high voltage generator applies a high voltage of a given magnitude to the electrode 63.

A microswitch 87 is closed when the carriage assumes its home position and is open when the carriage is displaced therefrom, and may be considered as a home position sensor. A signal indicating the closure or opening of the switch is fed by a home position detector circuit to the print controller 102. Another microswitch 88 is opened and closed as a cover of the printer is opened or closed, and a corresponding signal is fed by a cover open detector circuit to the print controller 102.

A carriage drive motor 89 comprises a pulse motor, and its energization is controlled by a carriage motor driver 89 which responds to an energize signal delivered by the print controller 102.

A microswitch 54 is adapted to detect the opening or closure of a paper bail which will be described later, and a corresponding signal is fed by a paper bail open detector circuit to the print controller 102.

A paper bail drive soleniod 35 is energized by a solenoid driver when an on signal is supplied thereto.

Data presenting a charging voltage is applied to D/A converter 111, and a corresponding analog voltage is applied to the charging electrode 62 by the charging voltage generator.

The ink jet projecting head includes an electrostrictive vibrator 80, and an exciting base pulse is applied to an exciting voltage generator which develops an analog exciting voltage having substantially sinusoidal waveform, which is applied to the vibrator 80. The ink which passes through the nozzle of the head is modulated by a pressure oscillation which is produced by the vibrator, whereby after the projection from the nozzle, the ink will be divided into ink particles at a periodic interval after travelling through a given distance.

Figure 3:
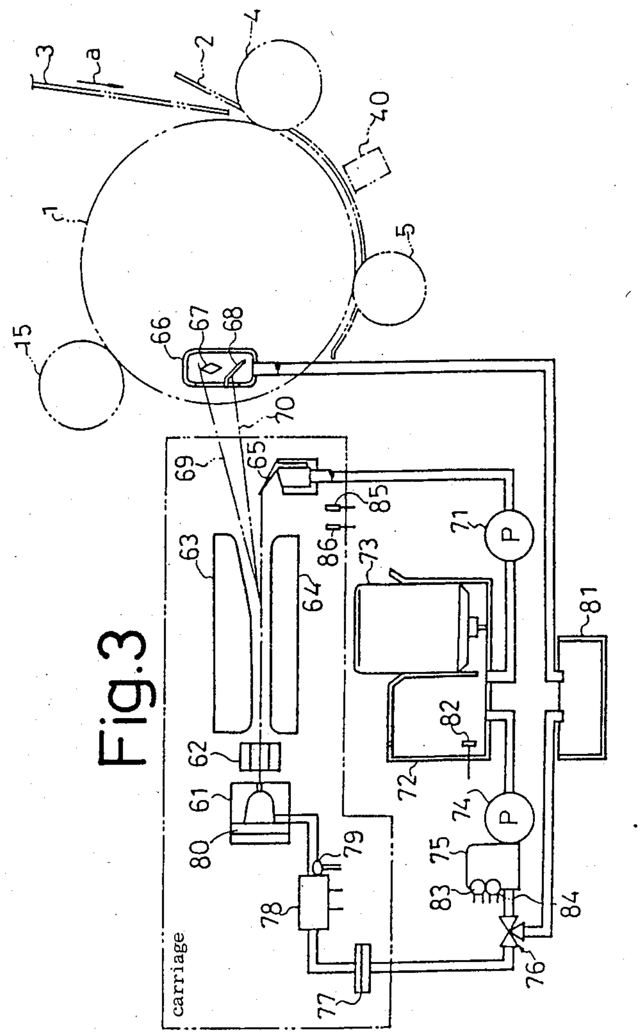
FIG. 3 is a schematic view of an ink circulating system of the embodiment shown in FIGS. 1*a* and 1*b;*

In the illustration of FIG. 1*a*, the following characters are used as abbreviations:

LFMD: line feed motor driver
CDR1: charge detector
HRCL: heater control
CDR2: charge detector
PRSR: paper sensor
ILDR: ink level detector
HIPD: high ink pressure detector
LIPD: low ink pressure detector
IKDR: ink detector
VAVD: valve driver
PMPD: pump driver
HVGR: high voltage generator
HPSR: home position sensor
CODR: cover open detector
CRMD: carriage motor driver
PBOD: paper bail open detector
SLDD: solenoid driver
EVGR: exciting voltage generator
CVGR: charging voltage generator FIG. 3 shows the general arrangement of an ink circulating system which is used in this embodiment. An ink reservoir 72 contains an ink which is supplied from a cartridge 73. An ink from the reservoir 72 is pumped to an accumulator 75 by a pressure pump 74. From the accumulator, the ink is fed through the solenoid operated switching valve 76 and through a filter 77 to be supplied to an ink jet projecting head 61. An ink stream or jet which is projected from a nozzle of the head 61 is divided into ink particles at the location of the charging electrode 62. If the ink particles are not charged, they move straightforward for impingement upon the gutter 65.

The filter 77, the heater 78, the head 61, the charging electrode 62, the pair of deflecting electrodes 63, 64, the gutter 65 and the pair of ink detecting electrodes 85, 86 are mounted on a carriage, not shown. An ink trap 66 is disposed so that its opening is located to receive ink particles which are projected from the head 61 and subject to deflection in excess of a given amount whenever the carriage is at its home position which is out of recording positions. An ink recovered by the ink trap 66 flows to a waste vessel 81.

The ink which is captured by the conductive gutter is withdrawn by a pump 71 to be returned to the ink reservoir 72.

When the switching valve 76 is deenergized, the ink outlet of the accumulator 75 is closed while a communication is established between the filter 77 and the waste vessel 81, whereby the ink located across the filter 77 flows to the waste vessel until the ink pressure within the head 61 reduces to the atmospheric pressure. The ink in the waste vessel is distarded at a suitable timing. It is to be noted that only the ink which is captured by the gutter 65 is returned to the ink reservoir for re-use.

FIG. 3 also shows a platen 1 around which a recording paper 3 is disposed by being guided by a deflector 2 into the nip between the platen and pressure rollers 4 and 5. A paper bail roller 15 is effective to hold the recording paper against the platen.

The paper sensor 40 is disposed substantially midway intermediate the pressure rollers 4 and 5. The sensor 40 is disposed rearwardly of the platen 1 for two reasons. First, it is difficult to dispose the paper sensor on the front side of the platen because the carriage is located very close to the front side of the platen, almost in contact therewith, and reciprocates along a platen shaft, which extends in a direction perpendicular to the plane of FIG. 3. Second, when the sensor is disposed on the front side of the platen, it is readily contaminated by an ink, increasing the maintenance work including the cleaning operation. The absence of the paper sensor at the record position or on the front side of the platen 1 in a region between the rollers 5 and 15, as viewed in FIG. 3, requires that the relationship between the record paper and a record position, namely, the point on the record paper where a recording operation by the head 61 takes place, must be determined as a function of the amount of paper feed which is applied after the leading edge of the record paper 3 has reached the paper sensor 40. The location of the trailing edge of the record paper 3 must be similarly determined as a function of the amount of paper feed which occurs after the trailing edge of the record paper 3 has passed through the paper sensor 40. For this reason, a paper position is automatically tracked by an arithmetic operation which is based on a detection signal from the paper sensor 40.

Figure 5:
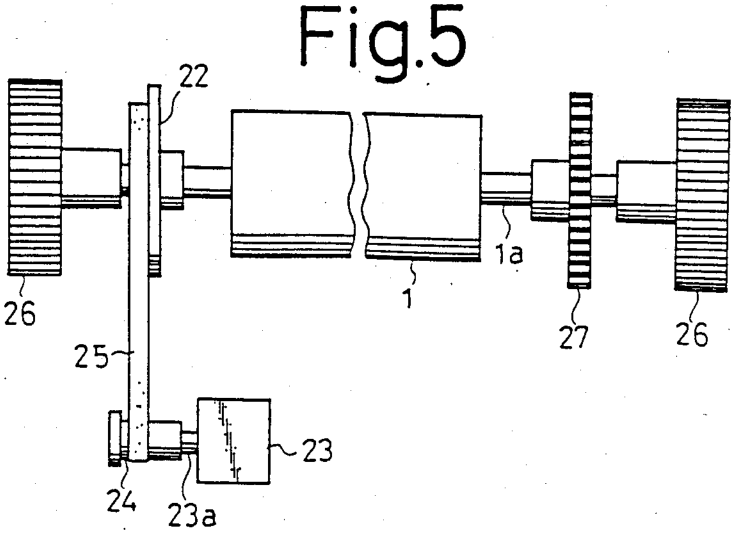
FIG. 5 is a front view of a platen drive system of the embodiment shown in FIGS. 1*a* and 1*b;*

The platen 1 is driven by the motor 23 (see FIG. 5) or by a manual rotation of a platen knob 26 (FIG. 5). In this circumstance, it is possible that when the paper is loaded properly and is detected by the sensor 40, the paper may be moved back or withdrawn in the opposite direction from the direction of insertion. In this instance, the logic may indicate the presence of the paper when there is no paper over the platen actually. Alternatively, the platen knob may be manually turned to deliver the paper out of the platen, but the logic may indicate that the trailing edge of the paper is located between the roller 5 and the recording position even though the sensor 40 indicates the absence of paper. If these events happen and an ink jet recording operation takes place, an ink jet will be projected against the platen 1 to mar it, requiring time and labor for its cleaning. In the embodiment being described herein, a paper feed control is incorporated which overcomes this problem, as will be further described later.

Figure 4:
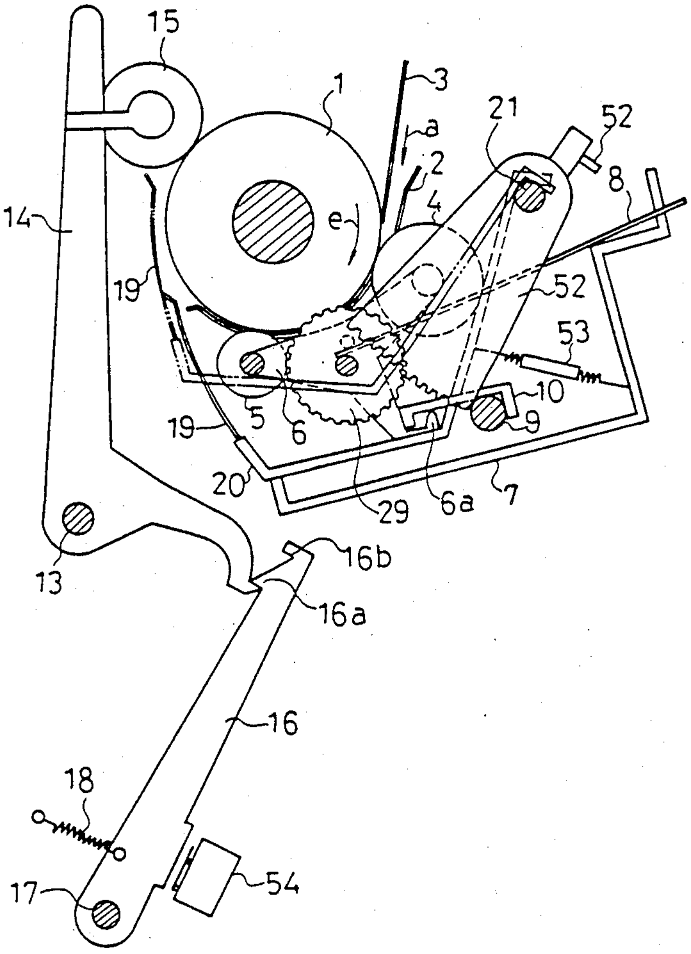
FIG. 4 is a side elevation of a feed mechanism of the embodiment shown in FIGS. 1*a* and 1*b;*

A paper feed mechanism will now be described. Referring to FIG. 4 initially, the deflector 2 in the form of curved or weavy plate is disposed adjacent to the platen 1 which is in the form of a roller. The deflector 2 guides the paper 3, which is inserted in a direction indicated by an arrow a, to move along the platen 1. A plurality of openings are formed in the deflector 2, and two rows of pressure rollers 4, 5 are disposed adjacent to these openings.

These pressure rollers 4, 5 are mounted on shafts which are carried by a holding member 6, which is urged toward the platen 1, by a leaf spring 8 having its one end secured to a stationary member 7, whereby the pressure rollers 4, 5 are urged against the platen 1.

The lower end of the holding member 6 is formed with a tab **6*a* and a rotary shaft 9 is disposed adjacent to the tab 6*a*. A release element 10 is secured to the rotary shaft 9 and has its free end disposed so as to be engageable with the tab 6*a* of the holding member 6**.

Figure 7:
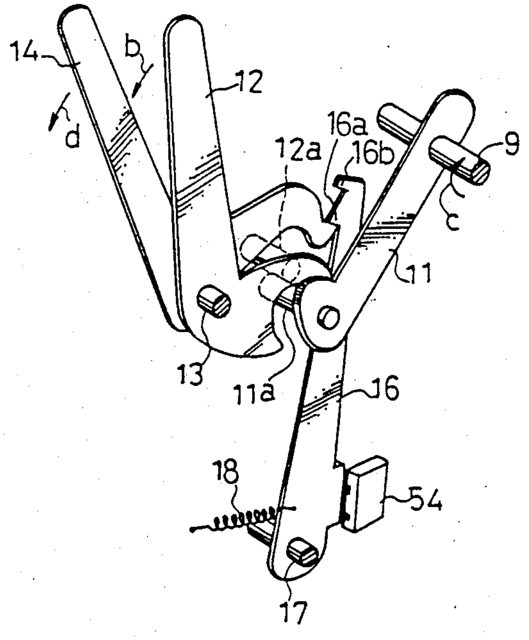
FIG. 7 is a perspective view of a paper bail roller drive system of the embodiment shown in FIGS. 1*a* and 1*b.

As shown in FIG. 7, a top portion of a swinging lever 11 is fixedly connected with the rotary shaft 9, and a lug **11*a* extends from the lower end of the lever 11. A release lever 12 is pivotally mounted on a support shaft 13 and has its lower end engaged with the lug 11*a* extending from the lever 11. When the top end of the release lever 12 is rotated by a finger, in a direction indicated by an arrow b, the lever 11 rotates to turn the rotary shaft 9 in a direction indicated by an arrow c. This causes the release element 10 to force the tab 6*a* of the holding member 6 down against the resilience of the spring 8, thus moving the pressure rollers 4, 5 away from the platen 1. If the top end of the release lever 12 is now rotated in the opposite direction from the direction indicated by the arrow b, the release element 10 is disengaged from the tab 6*a*, whereby the pressure rollers 4, 5 can be brought into abutting relationship with the platen 1 under the resilience of the spring 8**.

A paper bail lever 14 is rotatably mounted on the support shaft 13 adjacent to the platen 1, and carries the paper bail roller 15 on its top. Rotatably disposed below the paper bail lever 14 is a swinging lever 16 on a support shaft 17 so as to be engageable with the lever 14. The lever 16 is urged to rotate counter-clockwise by a tension spring 18. The upper end of the lever 16 is formed with a tab 16, and the lever 14 is adapted to engage the lever 16 in two steps. When the bail lever 14 moves angularly to engage under the tab **16*a* of the lever 16, the paper bail roller 15 is maintained in abutment against the platen 1 under the tension of the spring 18**.

When the upper end of the bail lever 14 is moved away from the platen 1 by a finger, the lower end of the lever 14 angularly moves the lever 16 against the resilience of the spring 18, thus moving past the tab **16*a* and becomes locked by a detent 16*b* formed on the lever 16, where the paper bail roller 15 is spaced from the platen 1**.

Conversely, if the paper bail lever 14 is moved angularly in a direction toward the platen 1 by using a finger when the roller 15 is spaced form the platen 1, the lower end of the lever 14 moves past the tab **16*a* to be engaged with the underside thereof, whereupon the roller 15 is returned to its original position where it abuts against the plate 1**.

When the release lever 12 is moved angularly in the direction of the arrow b shown in FIG. 7 in order to move the pressure rollers 4, 5 away from the platen 1, a lug **12*a* on the release lever 12 engages the lower end of the lever 14 and causes the lever 14 to move in the direction of the arrow b so that its lower end moves past the tab 16*a*, whereby the roller 15 is also moved away from the platen 1. It is noted that the lever 14 can be operated independently from the release lever 12**.

An auxiliary guide 19 in the form of a plate which is formed of a metal or synthetic resin is disposed adjacent to the reflector 2, and has a length which is substantially equal to the length of the platen. The auxiliary guide 19 is carried by a holding member 20, one end of which is secured to a rotary shaft 21. The auxiliary guide 19 is disposed in its phantom line position shown in FIG. 4 only for a given time interval so as to guide the leading edge of the paper 3 into the nip between the roller 15 and the platen 1 as it is fed from the deflector 2.

The platen 1 has a rotary shaft **1*a*, one end of which fixedly carries a belt pulley 22 as shown in FIG. 5. The motor 23 is disposed adjacent to the pulley 22, and has a drive shaft 23*a* on which a belt pulley 24 is mounted. A timing belt 25 extends around the both pulleys 22, 24, whereby the drive from the motor 23 is transmitted to the rotary shaft 1*a* of the platen 1 to cause it to rotate, thus rotating the platen 1 in a direction indicated by an arrow e. It will be seen that the motor 23, the pulleys 22, 24 and the belt 25 constitute together drive means which rotates the platen 1**.

A pair of knobs 26 are fixedly mounted on the opposite ends of the rotary shaft **1*a*. When the motor 23 does not drive the platen 1, either knob 26 may be rotated by a finger to rotate the platen 1**.

Figure 6:
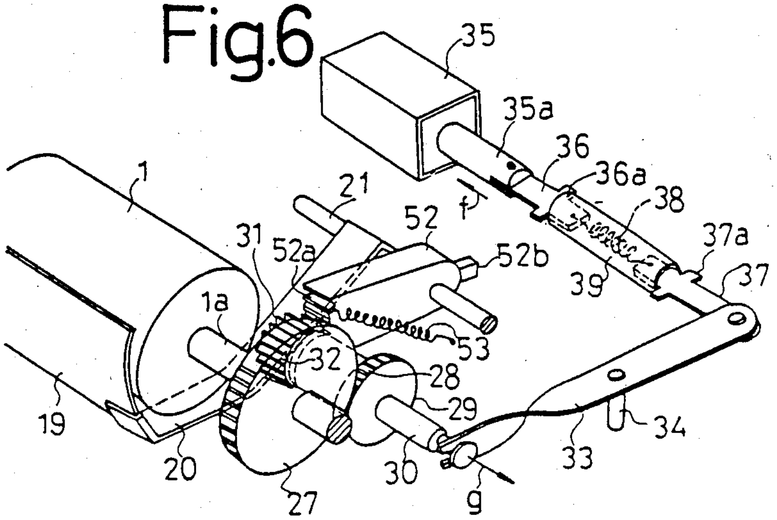
FIG. 6 is a perspective view of an auxiliary guide drive system of the embodiment shown in FIGS. 1*a* and 1*b;*

Referring to FIGS. 5 and 6, it will be noted that a gear 27 is fixedly mounted on the rotary shaft **1*a*. A rotatable cylinder 28 is disposed adjacent to the gear 27, and is rotatably supported by a bearing, not shown. On its outer periphery, the cylinder 28 fixedly carries a gear 29 which in turn meshes with the gear 27. A sliding shaft 30 is slidably disposed inside the cylinder 28 and the gaer 29, and a gear 31 is rotatably mounted on the sliding shaft 30. A portion of the gaer 31 which is disposed opposite to the cylinder 28 has a clutch plate 32** secured thereto.

The end of the sliding shaft 30 is connected to a forked end of a swinging lever 33, which is pivotally mounted on a pin 34 intermediate its length. A solenoid 35 is disposed adjacent to the swinging lever 33 and has an actuator rod **35*a*, to which a fastener 36 is connected in a rotatable manner. Another fastener 37 is connected to an end of the swinging lever 33, located nearer the solenoid 35, also in a rotatable manner. The both fasteners 36, 37 are connected together by a tension spring 38. Each of the fasteners 36, 37 is formed with a pair of lateral projections 36*a*, 37*a*, and a sleeve 39 is disposed to surround part of the fasteners 36, 37 and the spring 38. Unless a force in excess of a given value is applied to the spring 38, the tension of the spring 38 maintains the projections 36*a*, 37*a* extending from the fasteners 36, 37 in abutment against the opposite edges of the sleeve 39**.

The solenoid 35 has a coil **35*b* which when energized, drives the actuator rod 35*a* in a direction indicated by an arrow f as viewed in FIG. 6, and the resulting movement of the actuator rod 36*a* is transmitted to the swinging lever 33 through the combination of the fasteners 36, 37 and the spring 38, whereby the swinging lever 33 undergoes a swinging motion to cause a sliding movement of the sliding shaft 30 in a direction indicated by an arrow g. As the shaft 30 slides in the direction of the arrow g, the clutch plate 32 which is integral with the gear 31 is brought into abutment against the rotatable cylinder 28, and the force of friction acting between the clutch plate 32 and the cylinder 28 causes the rotation of the gear 29 to be transmitted to the gear 31** for rotating it.

When the coil 35*b* of the solenoid 35 is energized to drive the actuator rod 35*a* in the direction of the arrow f, the swinging lever 33 undergoes a swinging motion to cause the shaft 30 to slide in the direction of the arrow g to bring the clutch plate 32 into engagement with the cylinder 28, as mentioned previously, and in addition, the actuator rod 35*a* is driven through a further given distance to cause an elongation in the spring 38, to move the fastener 36 so that the projections 36*a* thereof is spaced a given distance from the sleeve 39. Accordingly, the clutch plate 32 is maintained in abutment against the rotatable cylinder 28 under the tension supplied from the spring 38.

When the solenoid 35 is deenergized, a spring, not shown, returns the actuator rod 35*a* to its original position, whereby the sliding shaft 30 moves in a direction opposite from that indicated by the arrow g, causing the clutch plate 32 on the gear 31 to be disengaged from the cylinder 28 to interrupt the transmission of rotation from the gear 29 to the gear 31.

As shown in FIGS. 4 and 5, a rotatable block 52 is disposed adjacent to the gear 31, and is fixedly mounted on the rotating shaft 21 to which one end of the holding member 20 which carries the auxiliary guide 19 is secured. The peripheral edge of the block 52 is formed with teeth 52*a* which are adapted to mesh with the gear 31. Accordingly, as the gear 31 rotates, its rotation is transmitted to the block 52, whereby the rotating shaft 21 is rotated, in turn rotating the holding member 20 secured thereto and the auxiliary guide 19 carried thereby.

As the auxiliary guide 19 moves close to the roller 15 as a result of rotation of the block 52 which occurs in response to the rotation of the gear 31, a further rotation of the block is prevented by a stop 52*b*, which extends in the opposite direction from the pheripheral edge in which the teeth 52*a* are formed, abutting against the stationary member 7. In this manner, the auxiliary guide 19 is positioned properly where it is disposed at a small spacing from the platen 1.

When the abutment of the stop 52*b* against the stationary member 7 has interrupted the rotation of the block 52 and when the solenoid 35 is energized to bring the clutch plate 32 on the gear 31 into abutting relationship with the rotatable cylinder 28, the rotation of the gear 29 merely results in a slip between the clutch plate 32 and the cylinder 28, preventing the gear 31 from rotating.

As a result of the described arrangement, when the solenoid 35 is energized, the rotation of the platen 1 is transmitted to the gear 31 which causes the block 52 to rotate clockwise, as viewed in FIG. 4, to raise the auxiliary guide 19 to its phantom line position shown in FIG. 4, and the roller 15 is moved away from the platen 1. When the solenoid 35 is deenergized, the block rotates counter-clockwise, as viewed in FIG. 4, whereby the auxiliary guide 19 returns to its position shown in solid line in FIG. 4, and the roller 15 is returned into contact with the platen 1. The switch 54 becomes open as the roller 15 moves away from the platen 1, and the switch 54 is closed when the roller 15 is brought into contact with the platen 1.

Figure 8A:
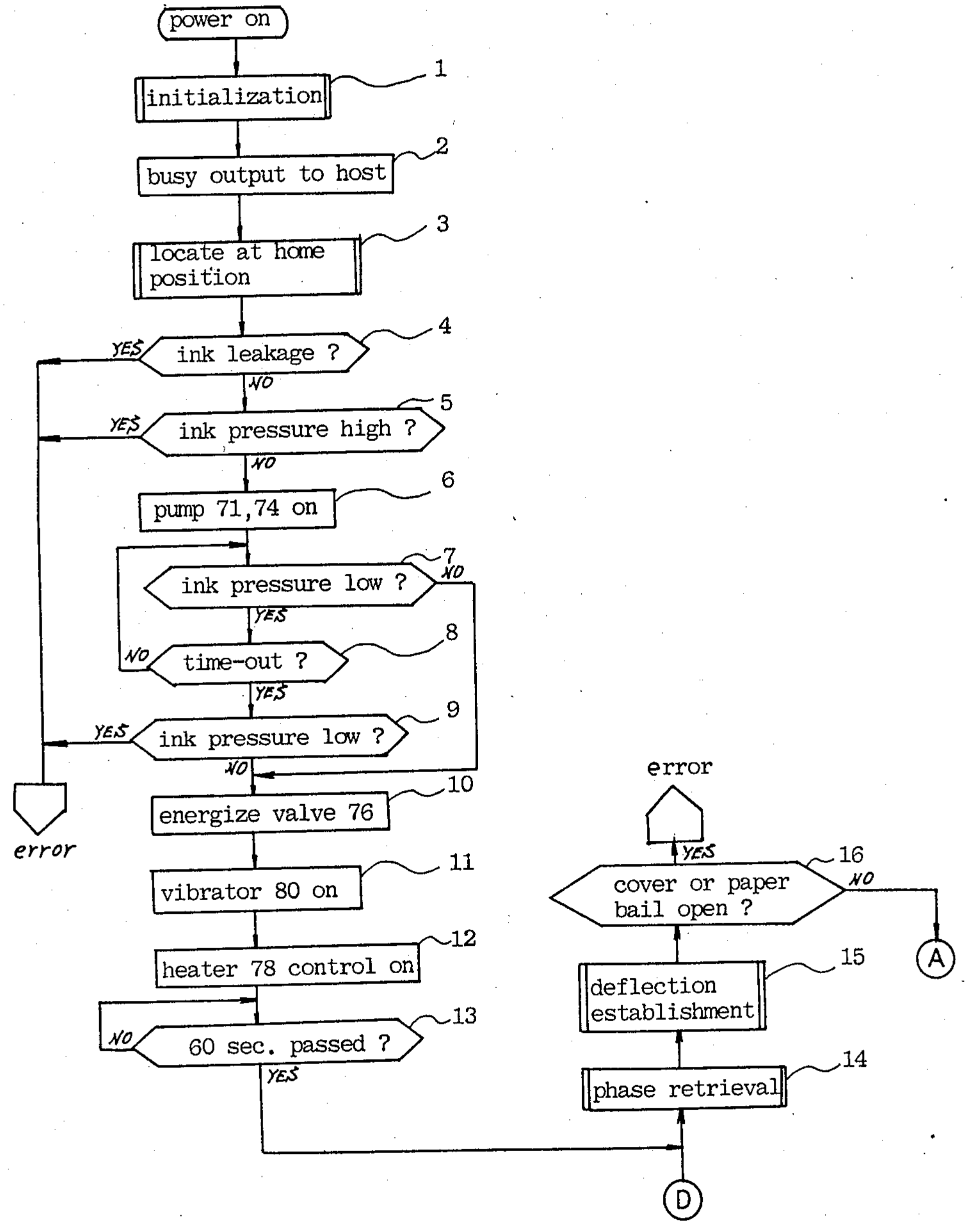
* and FIGS. 8*a,* 8*b,* 8*c,* 9*a,* 9*b* and 9*c* are flow charts representing the operation of microprocessors contained in the electrical control shown in FIG. 1 to control the projection of an ink jet and a printing or a recording operation.
Figure 8B:
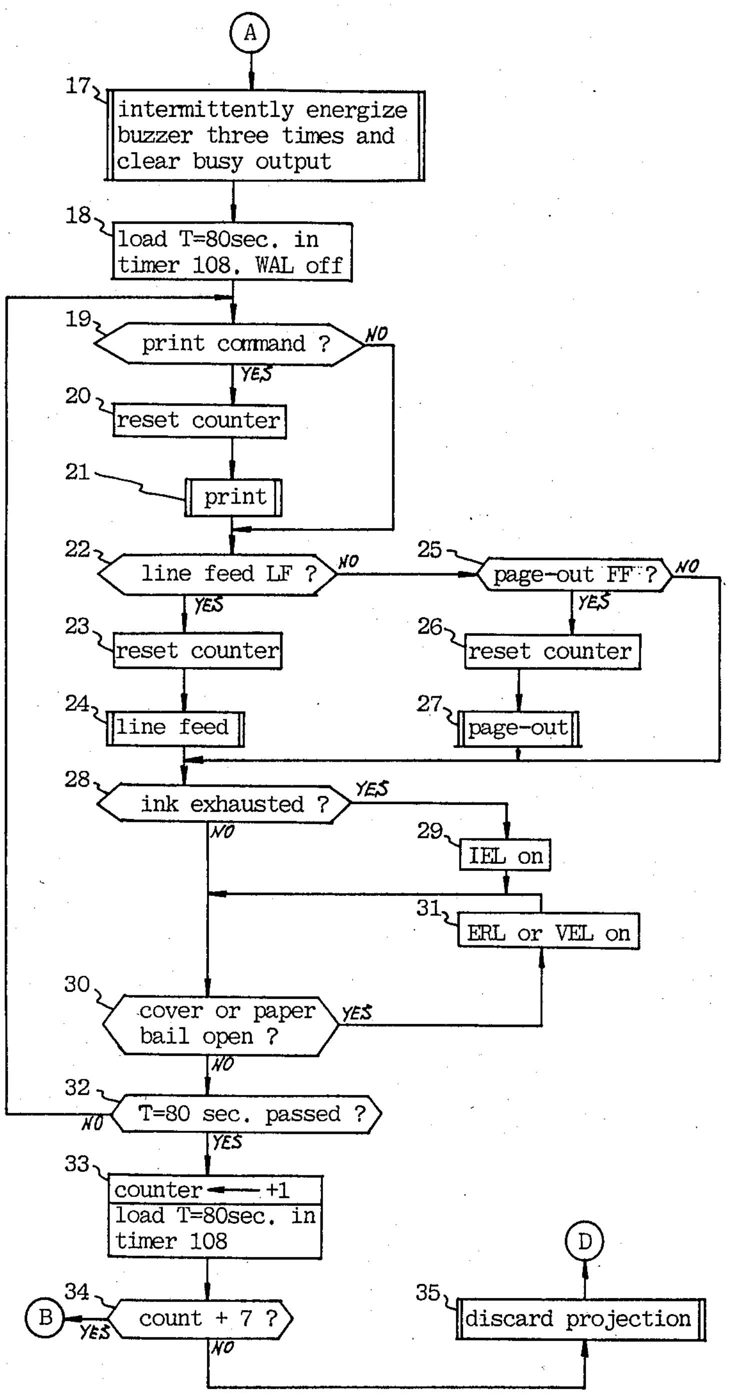
Figure 8C:
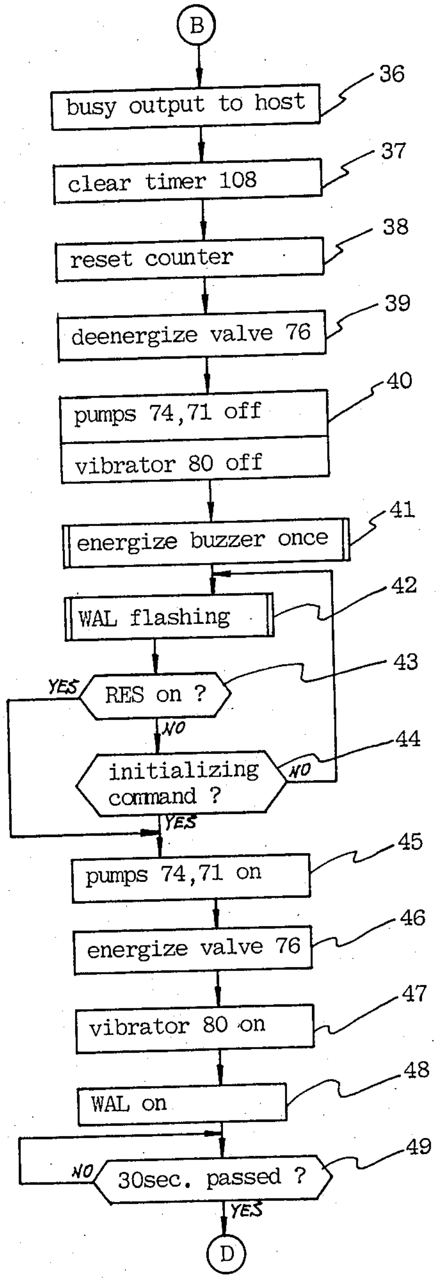

FIGS. 8*a*, 8*b* and 8*c* are flow charts illustrating a control operation by the print controller 102. It is to be understood that the data transfer controller 91 reads the status on the operating board 90, transfers status data to the controller 102, loads display data supplied from the controller 102 into the operating board 90, receives data to be printed and control signals from the host unit HTC and transfers status data to the host unit HTC. It is to be noted that the print controller 102 causes a reading of the status relating to the operating board 90 and a control of the display to be performed by the data transfer controller 91. Also, the reception and transmission of signals to or from the host unit HTC are undertaken by the data transfer controller 91.

When the power supply is turned on, the print controller 102 executes an initialization (step 1) and delivers a busy output to the host unit HTC (step 2), and locates the carriage at its home position (step 3).

A reference is then made to an output of the ink detector circuit which is connected to the electrodes 85, 86 (step 4), and if the output level indicates the presence of an ink, the program then proceeds to the processing of an error. If the output level indicates the absence of an ink, a reference is made to an output from the high ink pressure detector circuit which is connected to the pressure sensor 83 (step 5), and if the output level indicates the occurrence of a high pressure, the program proceeds to the processing of an error. If the output is not of a level which indicates the high pressure, a command is issued to a pump driver (step 6) which drives the pump 74 (ink pressure pump) and the pump 71 (ink recovery pump), and a given time interval is set in a program timer, and a reference is made to an output from the low ink pressure detector circuit which is connected to the pressure sensor 84 (step 7), thus waiting for the ink pressure to rise. If the output from the low ink pressure detector circuit ceases to indicate the low pressure before the timer times out (step 9), the solenoid operated switching valve 76 is energized (step 10). If the timer times out while the output of the low ink pressure detector circuit indicates the occurrence of the low pressure, the program proceeds to the processing of an error. When the switching valve 76 is energized (step 10), the application of an exciting voltage to the electrostrictive vibrator 80 is initiated (step 11), and an on control output is delivered to the heater control circuit, and 60 sec timer is started (step 12).

The described coontrol operation causes an ink jet to be projected from the head 61, and the projected ink stream is periodically separated into ink particles substantially at the center of the charging electrode 62, whereby the ink particles impinge upon the gutter. The print controller 102 then waits for the 60 sec timer to time out under this condition. Upon time-out, a phase retrieval is executed (step 14). During the phase retrieval, a charging voltage is applied to the charging electrode without applying deflecting voltages to the deflecting electrodes 63, 64. The phase of the charging voltage is sequentially shifted until the charge detector circuit connected to the gutter 65 produces a signal which indicates the presence of a charge. If the presence of a charge is detected during the phase retrieval, the prevailing phase of the charging voltage represents an optimum charging phase, and hence a charging voltage applied to the electrode 62 is centered about that phase until the next phase retrieval is effected.

Upon completion of the phase retrieval, an amount of deflection is established (step 15). At this time, the carriage is located at its home position, and a standard charging voltage which should cause the maximum deflection is applied to the electrode 62. A reference is made to an output from the charge detector circuit which is connected to the electrode 67, and as long as the output does not indicate the presence of a charge, the magnitude of the charging voltage is reduced in an decremental manner until the presence of a charge is detected. Thereafter, the magnitude of the charging voltage continues to be increased in an incremental manner until the indication changes from the presence to the absence of a charge. Thereupon, the prevailing magnitude of the charging voltage is read, and a difference between this magnitude and the standard voltage is calculated to determine an amount of correction. In this manner, the charging voltage to be applied in each deflection step of a printing operation is determined.

When the amount of deflection is established, the status of the switches 88, 54 is read. If the printer cover is open or the roller 15 is spaced from the platen 1 (paper bail open), the program proceeds to the processing of an error (step 16). When the printer cover is closed and the roller 15 is in contact with the platen 1, the system is ready to initiate a printing operation. Hence, a buzzer BZ is intermittently energized three times, clearing a busy output delivered to the host unit (step 17), and a time limit T=80 sec is loaded into the timer 108, which is then started. The standby lamp WAL is deenergized. It is to be noted that the standby lamp WAL has been energized at step 1 of the initialization.

Data to be printed and a command are then transferred from the host unit HTC, thus proceeding to a print control step 21. Specifically, when data to be printed and a command are supplied from the host unit HTC, the program initially determines if a print command is received (step 19) and if it is yes, resets or clears a counter (register) which stores data to be used in a decision to interrupt the projection of an ink jet (step 20), and then execute a print operation (a recording operation based on the supplied data to be printed) (step 21). Upon completing a printing of data to be printed (normally corresponding to one line), the program then waits for another supply of data to be printed and a command. If a line feed command LF is supplied from either the operating board 90 or the host unit HTC (step 22), the counter is reset, and a line feed operation is executed, namely, the paper is fed by a distance corresponding to the one line spacing (step 24). If a page-out command FF is supplied (step 25), the counter is reset (step 26) and a page-out operation or the delivery of a paper is executed (step 27). After these executions or in the absence of any command therefor, a reference is made to an output from the ink level detector circuit which is connected to the electrode 82 (step 28), and if the absence of an ink is indicated, an energization of the indicator lamp IEL is set (step 29). Subsequently or if the presence of an ink is indicated, a reference is made to status signals from the switches 88 and 54, and an energization of the indicator lamp ERL is set when the print cover is open while an energization of the indicator lamp VEL is set when the roller 15 is away from the platen 1, and a busy output to the host unit is delivered (step 31). Then the system remains in a condition projecting an ink jet until the cover is closed and the roller 15 is closed or brought into contact with the platen 1 (step 30).

It will be seen that the projection of an ink jet is not subject to a time limit, but is continued until both the printer cover the roller 15 assumes their closed positions for the second time subsequent to opening the printer cover or opening the roller 15 immediately after energizing the buzzer BZ three times (step 17) after closing the printer cover and moving the roller 15 to its closed position and turning on the power to the printer to initiate the projection of an ink jet. Accordingly, when an operator desires to perform an aging projection of an ink jet over a prolonged length of time as may be necessary after moving about the printer, he may close the printer cover, bring the roller 15 to its closed position and turn the power supply to the printer on to start the projection of an ink jet in a normal manner, and may open the printer cover or bring the roller 15 to its open position after the buzzer BZ has been energized three times (step 17). After the termination of a desired aging projection, the printer cover may be closed and the roller 15 may be moved to its closed position.

When the printer cover remains closed and the roller 15 remains at its closed position since the power is turned on or when both the printer cover and the roller 15 assume their closed positions for the second time subsequent to opening either the printer cover or the roller 15 immediately after the buzzer BZ has been energized three times (step 17) after initiating the projection of an ink jet by closing the printer cover, bringing the roller 15 to its closed position and turning on the power supply to the printer, the program proceeds to a next step 32 to see if the timer which has been loaded at step 18 has timed out. If the timer has not timed out, a busy output to the host unit is cleared, and the program waits for a print command at step 19, or waits for the supply of data to be printed and any command. When data to be printed and a command are supplied including a print instruction (step 19), the counter is reset again (step 19).

If it is found at step 32 that 80 sec timer has timed out, the counter is incremented by one, and a time interval of 80 sec is again loaded into the timer 108, which is then started (step 33). A reference is made to the content of the counter. If the counter has a count of 7, this means that none of a print command, a line feed command LF or a page-out command FF has been supplied during a given time interval which is equal to 7×80 sec=560 sec. During such time interval, the projection of an ink jet has been continued. Hence, the program proceeds to a step 36 where the projection of an ink jet is interrupted.

If the counter does not have a count of 7, this means that a length of time which necessitates the interruption of the projection of an ink jet has not passed, and hence the projection of an ink jet is continued. However, as mentioned previously, the phase retrieval, the establishment of the amount of deflection and the discard of a given amount of ink take place at an interval of substantially 80 sec. Accordingly, the carriage is located at its home position to perform the phase retrieval (step 14), the establishment of the amount of deflection (step 15) and the projection of an ink jet for an interval of 2.5 sec (step 35). During the projection of an ink jet for the interval of 2.5 sec at step 35, a voltage is applied to the charging electrode in order to charge ink particles so that they impinge upon the lower surface of a partition 68 (see FIG. 3). When these steps are complete, the program proceeds through the steps 16, 17 and 18 and then waits for the supply of data to be printed and command. When such data and command are supplied, the counter is reset (step 20) and the print operation is executed (step 21). During the time the program waits for the supply of data to be printed and a command, it proceeds to the step 22 and following steps.

When the program waits for the supply of data to be printed and a command for a given time interval (7×80 sec), or when data to be printed and a command including a print command, a line feed command, or a page-out command are not supplied from either the host unit or the operating board during the given time interval, the program proceeds from the step 34 to a step 36 when the counter reaches a count of 7 or when the time interval equal to 7×80 sec has passed. The program then delivers a busy output to the host unit, clears the timer 108 (or interrupt the time limit operation) (step 37), clears the counter (step 38), deenergizes the switching valve 76 (step 39) and deactivates the pumps 74 and 71 and ceases the operation of the vibrator 80 (step 40). Then it energizes the buzzer BZ only once (step 41), sets up the standby lamp WAL for a flashing operation (step 42), and then waits for an ink jet projection command, produced by closing the reset switch RES at the operating board 90 (step 43) or waits for an initializing command from the host unit (step 44). In other words, the system interrupts the projection of an ink jet and waits for an ink jet projection command from either the operating board 90 or the host unit HTC.

The operator is informed about the automatic interruption of the projection of an ink jet by sounding the buzzer BZ only once and is also informed about that the projection of an ink jet is being interrupted by a flashing operation of the standby lamp.

If the reset switch RES on the operating board 90 is closed or an initializing command is produced by the host unit during the time the projection of an ink jet is interrupted, the program proceeds from either step 43 or 44 to a step 45 where the pumps 74 and 71 are set up to be driven. The energization of the switching valve 46 is set up (step 46), the excitation of the vibrator 80 is set up (step 47), the standby lamp WAL is set for continuous energization (step 48) and a 30 sec timer is started. When the 30 sec timer has timed out, the program proceeds to the phase retrieval at step 14.

It will be understood that by the described control operation, when either the reset switch RES is closed or an initializing command is produced by the host unit subsequent to the interruption of the projection of an ink jet, the projection of an ink jet is re-initiated, and the phase retrieval and the establishment of the amount of deflection are initiated 30 sec later. When these steps are complete, the buzzer BZ is sounded three times. The printing operation is then enabled.

The control operation described above can be summarized as follows:

(1) When the power supply to the printer is turned on, the projection of an ink jet is initiated, and the printing operation is enabled substantially 80 sec after the initiation of the ink jet. The fact that the printing operation is enabled is informed by sounding the buzzer three times. The projection of an ink jet is continued as long as data to be printed and a control command are supplied within a time interval which is substantially equal to 7×80 sec, and the phase retrieval, the establishment of the amount of deflection and discarging ink projection for an interval of 2.2 sec are repeated at a period of substantially 80 sec. The standby lamp WAL is continuously energized or illuminated until preparations for the printing operation are complete.

(2) If data to be printed and a control command are not supplied within a time interval which is substantially equal to 7×80 sec since the printing operation is ready (indicated by sounding the buzzer three times) or after the termination of the previous printing operation, the projection of the ink jet is automatically interrupted. However, a control over the ink temperature is continued during such interruption. The buzzer is sounded once when the projection of the ink jet is interrupted, and the standby lamp WAL flashes as long as the projection of the ink jet is being interrupted.

(3) When the reset switch RES is closed or an initializing command is produced by the host unit during the time the projection of an ink jet is being interrupted, the projection of the ink jet is re-initiated. It will be seen that in this instance, the preparation for the printing operation will be complete in an interval (30 sec) which is less than the interval (60 sec) required for the printing operation to be ready immediately after the power supply to the printer is turned on. The standby lamp WAL is continuously illuminated until the preparations for the printing operation are complete.

(4) The automatic interruption of the projection of the ink jet is inhibited by opening the printer cover or moving the roller 15 away from the platen 1 after the buzzer has been sounded three times. The projection of the ink jet is continued until the printer cover is closed and the roller 15 is brought into contact with the platen 1.

Figure 9A:
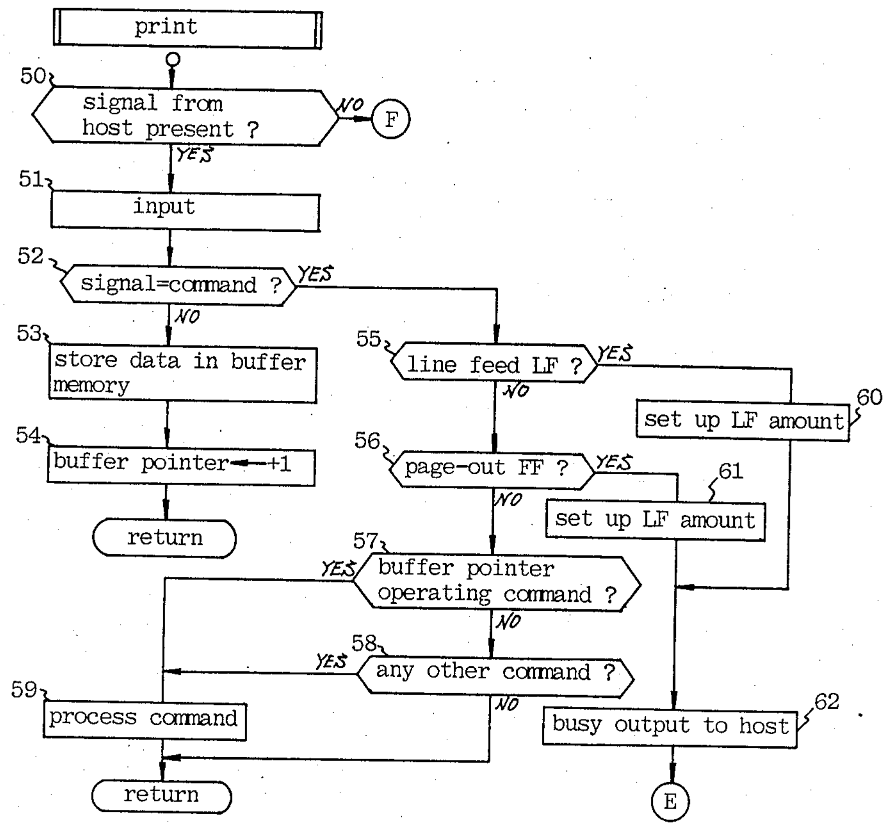
Figure 9B:
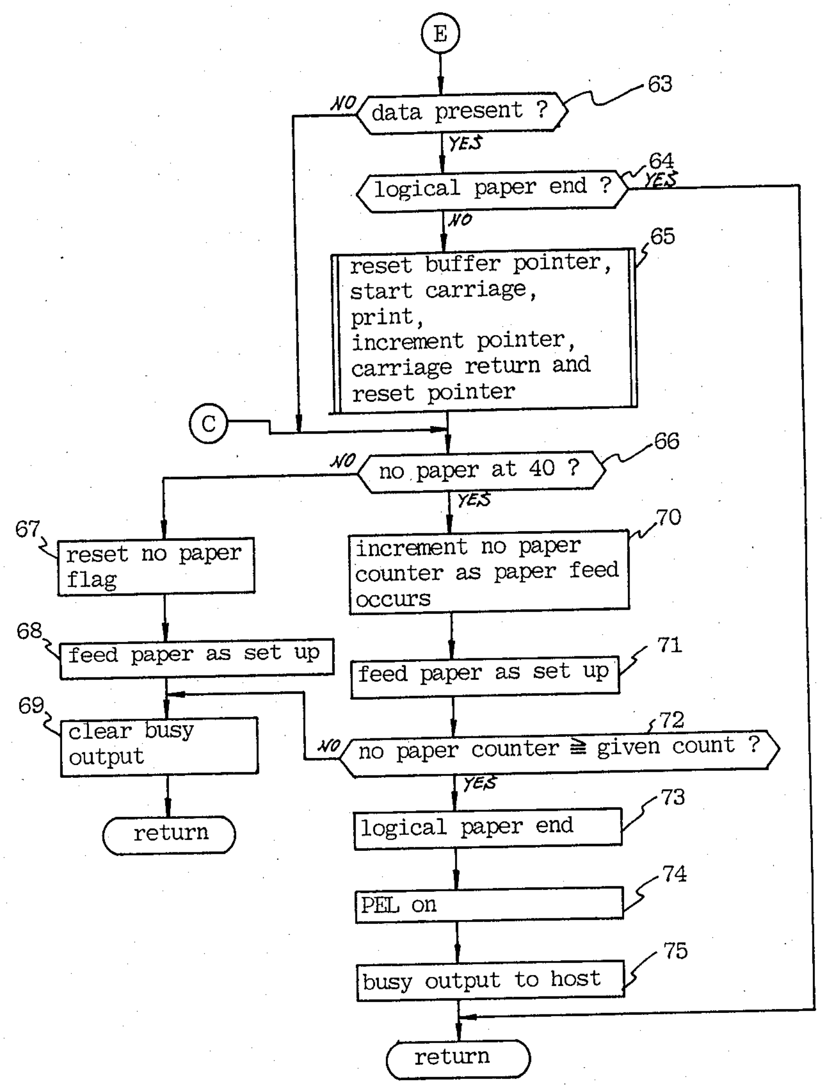
Figure 9C:
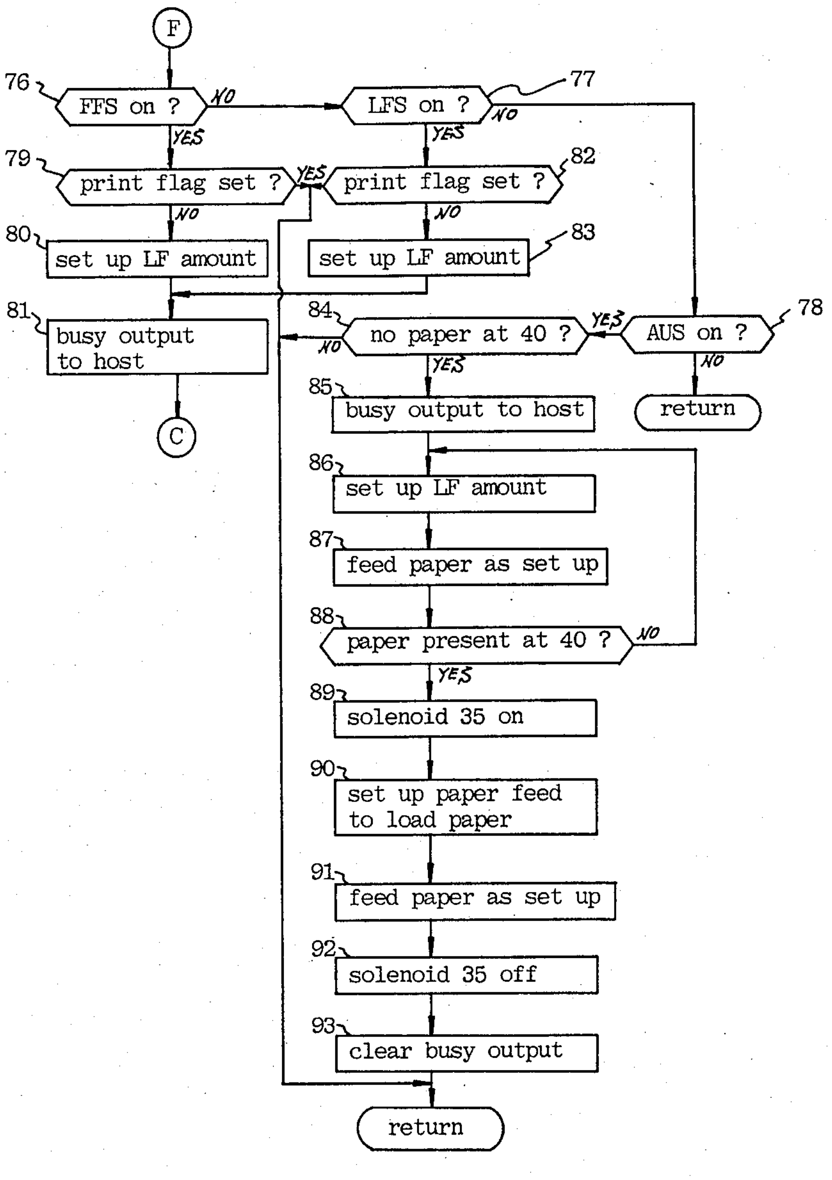

FIGS. 9*a*, 9*b* and 9*c* are flow charts illustrating a paper feed control operation during the printing operation. This control is performed by both the print controller 102 and the data transfer controller 91. If a signal is delivered from the host unit (step 50) during the time the program waits for the supply of data to be printed and a command, the signal is received. If the signal represents data to be printed, such data is stored in a data buffer (steps 51, 52, 53 and 54). If the signal represents a control command, a control operation in accordance with the command is performed. Thus, a line feed operation takes place in response to a line feed command, a paper deliver takes place in response to a page-out command, and any other control is executed in accordance with other command (steps 55 to 59). The control of a line feed and a paper delivery will now be described.

In response to a line feed command, the program proceeds from the step 55 to a step 60 where a paper feed corresponding to one line or a corresponding drive to be applied to the platen 1 is set up. A busy output is delivered to the host unit (step 62) and a reference to the presence or absence of next data to be printed is made (step 63). If next data to be printed is absent, a reference is made to the paper sensor 40 to see if it has detected the presence of a paper (step 66). If the paper sensor 40 has detected the presence of a paper, this indicates that a paper is disposed around the platen 1. No paper flag, indicating the absence of a paper at the location of the sensor 40, is cleared (step 67), and the platen 1 is driven through an amount corresponding to the paper feed which is established at either step 60 or 61 (step 68), and the busy output to the host unit is cleared.

If no paper is present at the location of the paper sensor 40, a reference is made to the no paper flag, and if it is reset, the flag is set. The platen is driven through an amount corresponding to the paper feed set up while incrementing a no paper counter which counts the amount of paper feed since the no paper flag has been set (step 71). The content of the no paper counter is compared to a given fixed value which represent the amount of paper movement required for the trailing edge of the paper to leave the roller 5 after it has left the paper sensor 40. If the count is less than this value, the printing operation is still possible, thus clearing the busy output or flag supplied to the host unit (step 69). If the count is equal to or greater than the given value, it is no longer possible to effect a printing operation, and hence a logic paper end flag is set (step 73), an energization of no paper indicator lamp PEL is set up, and a busy output to the host unit is set.

If it is found at step 63 that next data to be printed is present, a reference is made to the logic paper end flag, and if it is reset, indicating that the printing operation is possible, the printing operation is controlled at step 65. Upon completion thereof, the program repeats the detection of paper and the processing operation which begin with the step 66.

If it is found at step 50 that no signal is supplied from the host unit, the switch status on the operating board 90 is read. If the page-out command switch FFS is closed (step 76), a reference is made to a print flag. The print flag is set when a printing operation based on data to be printed is initiated, and is cleared or reset upon completion of the printing operation. It is a flag which indicates "initiating and terminating the reception of a signal from the host unit and the termination of a given task in accordance with a command contained in the signal" during the printing operation. If the flag is set, the page-out operation is impossible since the platen 1 will be marred if the page-out operation occurs under this condition. Accordingly, the program returns to the main routine (FIG. 8*b*), waiting for the completion of a printing operation.

If the print flag is reset, an amount of paper feed required for a page-out or paper delivery is set up (step 80), a busy output to the host unit is set (step 81) and then the program proceeds to the step 66. It proceeds from the step 66 through steps 67, 68, 69, thus returning to the main routine. The program also proceeds from the step 50 of FIG. 9 through the steps 76, 79, 80, 81 and 66, and when the sensor 40 has detected the absence of a paper, it proceeds through the steps 66, 70, 71, 72 and 69, thus returning to the main routine. Also the program proceeds from the step 50 of FIG. 9 through the steps 76, 79, 80, 81 and 66, and also through the steps 70, 71 and 72, and when the content of the no paper counter exceeds the given value (or when the trailing edge of the paper around the platen 1 has left the roller 5), it then proceeds to the steps 73 to 75, thus ceasing the paper feed operation. The paper which has been delivered out of the platen 1 at the time the paper feed operation ceases can be taken out of the platen 1 by raising the roller 15. The no paper lamp PEL is illuminated under the condition that the paper delivery has been completed in this manner.

If the line feed command switch LFS is closed (step 77), a reference is made to the print flag, and if it is reset, a paper feed corresponding to one line is set up (step 83), and the program proceeds to the steps 81 to 66. It is to be noted that when the switch LFS is closed, a paper feed by one line is executed at the time the switch transitions from its open to closed condition, and the paper feed is not repeated again until the switch LFS returns to its open condition from its closed condition.

When loading a paper around the platen 1, the operator inserts the paper along the guide 2 until it reaches the roller 4, and then manually turns the knob 26 (manual loading) or closes the automatic paper load command switch AUS (automatic paper loading). When the automatic paper load command switch AUS is closed (step 78), a reference is made to the paper sensor 40 if it has detected the presence of a paper. If the sensor 40 has detected the presence of a paper, a previous paper is disposed around the platen 1, and hence no paper feed operation takes place. If the sensor 40 has not detected the presence of a paper, a busy output to the host unit is set (step 85), and a given amount of paper feed is set up (step 86), and the platen 1 is driven to perform a paper feed by an amount which has been set up (step 87). This allows the inserted paper to be fed in a direction toward the paper sensor 40 from the roller 4. A reference is then made to an output from the paper sensor 40, and an amount of paper feed is set up (step 86) and the platen 1 is driven in accordance therewith (step 87) until the paper sensor 40 produces a signal indicating the presence of a paper. When the paper sensor 40 has detected the presence of a paper, indicating that the leading edge of the inserted paper has reached the location of the paper sensor 40, an energization of the solenoid 35 is set up in order to feed the paper until it reaches the roller 15 (step 89). This allows the auxiliary guide 19 to be raised to its phantom line position shown in FIG. 4, and causes the lever 14 to be rotated counter-clockwise, whereby the roller 15 is moved away from the platen 1.

An amount of drive which must be applied to the platen to feed the paper such that the leading edge thereof is conveyed from the location of the sensor 40 to a location immediately below the roller 15 is set up (step 90), and the platen is driven accordingly (step 91). The solenoid 35 is then turned off (step 92). At this time, the leading edge of the paper is pressed against the platen 1 by the roller 15, and the auxiliary guide 19 has been lowered to the solid line position shown in FIG. 4 (standby mode). The busy flag supplied to the host unit is then cleared (step 93), and the program returns to the main routine (FIG. 8), waiting for the supply of data to be printed and a command from the host unit.

The paper feed control described above can be summarized as follows:

(5) When no paper is loaded around the platen 1, the operator inserts the paper until it reaches the roller 4, and then closes the automatic paper load command switch AUS. Thereupon, the platen 1 is initially driven, whereby the paper is fed inward toward the paper sensor 40. When the paper sensor 40 detects the leading edge of the paper, the solenoid 35 is energized, whereupon the auxiliary guide 19 is raised and the roller 15 is driven away from the platen 1. The paper feed or the drive to the platen is continued until the leading edge of the paper reaches the location immediately below the roller 15, whereupon the solenoid 35 is deenergized to cease the drive applied to the platen 1 and to lower the auxiliary guide 19, thus allowing the leading edge of the paper to be pressed against the platen 1 by the roller 15.

(6) When data to be printed and a command are supplied from the host unit, a printing operation for such data and a paper feed operation take place. The printing operation based on such data and an associated paper feed operation are repeated each time data to be printed and a command are supplied. During such operation, if the paper sensor 40 detects the absence of a paper, indicating that the trailing edge of the paper has passed through the location of the paper sensor 40, the no paper counter counts up an amount of paper feed which has taken place since the absence of a paper is detected. When such amount of paper feed determined by the counter reaches a value which corresponds to the paper length extending between the paper sensor 40 and the roller 5 or when the trailing edge of paper has left the roller 5, the no paper indicator lamp PEL is illuminated, and the initiation of the printing operation is disabled. Under this condition, the operator removes the paper from the platen 1 and loads a fresh paper into the guide 2 and then closes the automatic paper load switch AUS. A control operation as mentioned in the paragraph (5) then takes place.

(7) A line feed, a page-out or an automatic paper loading operation which may be instructed by an operation of manual key switches on the operating board 90 is not executed since the initiation of reception of data to be printed and a command from the host unit until the end of the printing operation for such data or until the end of a task instructed by the command. A task instructed by a manual key switch operation is executed during the standby mode during which a signal from the host unit is being waited for.

(8) It is impossible to detect the leading and the trailing edge of the paper with the sensor alone. Hence, the position of the leading end of the paper as well as the printing position are determined by calculating the amount of paper feed logically has occurred since the sensor has detected the leading edge of the paper. Similarly, the position of the trailing edge of the paper is determined by logically calculating the amount of paper feed which has occurred since the sensor has detected the trailing edge of the paper. As a result, if the paper which has once been loaded around the platen 1 is pulled back in a direction opposite from the direction of insertion, the actual location of the paper will be different from that which is determined logically, thus upsetting the automatic paper loading. To accommodate for this, the automatic paper loading operation is controlled on the basis of a detection of an actual condition by the paper sensor 40. The automatic paper loading is invalidated as long as the paper is being detected by the paper sensor 40. However, when no paper is detected by the sensor, the automatic paper loading is enabled if the paper is actually loaded around the platen 1 or if its trailing edge is located between the sensor 40 and the roller 15, thus allowing a fresh paper to be automatically loaded around the platen. In this instance, the old paper is delivered out of the platen by the automatic paper loading operation. It will be seen that because the automatic paper loading operation is enabled or disabled by a condition detected by the paper sensor 40, an inadvertent operation of the switch AUS during the time the trailing edge of the paper is located between the sensor 40 and the roller 5 and a printing operation is taking place may result in the paper being delivered, whereby the platen 1 will be marred by the ink. The operation described in the paragraph (7) is designed to prevent this.

From the foregoing, it will be appreciated that the invention permits a single paper sensor, disposed rearwardly of the platen, to be used to enable the print controller to achieve an exact printing over a desired range of the record paper, and also permits a loading of a record paper around the platen and its feed control in an accurate manner.

It will also be seen that the invention reduces the possibility that the projection of an ink jet may be interrupted when a printing operating is going to be initiated, thus avoiding a retardation of the printing operation. The temperature control of the ink is continued during the time the ink jet is interrupted, thus reducing the length of time which is required until the ink jet becomes stabilized upon re-initiation thereof, thus accelerating the initiation of the recording operation.

In the preferred embodiment of the invention, the operator is enabled to recognize if the projection of an ink jet is continued or interrupted, by referring to the operating board. If the operator schedules a print-out within a reduced length of time even though the projection of an ink jet is being interrupted, he may operate the reset switch to initiate the projection of an ink jet beforehand. The buzzer produces an acoustical output which indicates when the projection of an ink jet is interrupted or when the printing operation is ready. The ink in the head is discarded to the waste vessel at the time the projection of an ink jet is interrupted, when the amount of deflection is established and also at a periodic interval, thus achieving an ink refreshing at an early point to assure that a good ink jet response is maintained. When the printing operation is interrupted over a given time interval to interrupt the projection of an ink jet, the subsequent re-initiation of the projection of an ink jet occurs with a rise time (30 sec) which is less than a corresponding rise time (60 sec) required immediately after the power turn-on. This reduces the waiting time until the printing operation is initiated. As mentioned, the projection of an ink jet is not interrupted when given conditions are satisfied, thus allowing an intended aging projection to be continued over a desired time interval which may be required subsequent to a movement of the printer.

Having described a preferred embodiment of the invention, modifications will be evident to those skilled in the art without departing from the scope of the invention as defined by the appended claims.

What is claimed is:

1. A printer comprising:

a platen having a peripherial surface;

print means disposed opposite to part of said peripheral surface of said platen;

guide means for guiding a sheet of paper from a region of said peripherial surface of said platen which is located diametrically opposite to said print means to a region of said peripheral surface which is opposed by said print means, said guide means including a paper inlet;

a first roller disposed in abutment against said peripheral surface of said platen in a region which is generally diametrically opposite to said print means;

a second roller disposed for abutment against said platen in a region between said first roller and the region of said peripheral surface of said platen which is opposed by said print means;

a paper bail roller for holding a part of the sheet of paper passing said second roller and the front of said print means;

drive means for driving at least one of said platen, said first roller, and said second roller for rotation in response to a signal;

paper sensor means disposed intermediate said paper inlet of said guide means and said second roller for detecting the presence or absence of a sheet of paper; and a print controller including means for energizing said drive means until the leading edge of the sheet of paper reaches said paper bail roller in response to a paper load command signal at the time the paper sensor means detects no paper, means for calculating a first amount of paper feed which occurs after said paper sensor means changes from detecting the absence to detecting the presence of a sheet of paper, for calculating a second amount of paper feed which occurs after said paper sensor means changes from detecting the presence to detecting the absence of a sheet of paper, and means for controlling a printing operation and the energizing of said drive means in accordance with data to be printed and a control command commencing from a time when the first amount of paper feed has reached a first given value until the second amount of paper feed has reached a second given value.

2. A printer according to claim 1, further comprising alarm means, said print controller further including means for ceasing a printing operation when the second amount of paper feed has exceeded the second given value and activating said alarm means.

3. A printer according to claim 1, further comprising an operating board, and a line feed command switch, a page-out command switch, and an automatic paper load command switch on said operating board, said print controller further including means for setting up a line feed, a page-out, and a paper loading operation in response to operation of said line feed command switch, said page-out command switch, and said automatic paper load command switch, respectively.

4. A printer according to claim 3 in which said print controller further includes means for overriding an operation of said line feed command switch, said page-out command switch, and said automatic load command switch on said operating board whenever said print controller receives data to be printed and a control command and whenever a printing operation or a paper feed operation is being set up in response to such data and command.

5. A printer according to claim 1, further comprising:

an ink reservoir;

an ink jet projecting head under pressure;

a pump for supplying ink from said ink reservoir to said head;

a solenoid valve assembly disposed between said head and said pump for controlling the supply of ink to said head;

a temperature controller for controlling the temperature of the ink supplied to said head at a given value;

a charging electrode for selectively charging the ink as it is projected from said head;

a pair of deflecting electrodes for developing a deflecting field for application to the charged ink;

an ink receiver for capturing non-printing ink which is projected from said head; and a paper feeder for maintaining the paper at a printing position and for feeding the paper;

the print controller further including controlling means for controlling the driving and stopping of said pump, the energizing and deenergizing of said solenoid valve assembly, the application of a charging voltage to said charging electrode, and a feed operation by said paper feeder, said controlling means being operative to stop said pump and render said solenoid valve assembly in a condition to cease the supply of the ink to said head whenever it fails to receive a print control command such as a print command, a line feed command, a page-out command or the like over a given time interval and to initiate driving said pump and render said solenoid valve assembly in a condition in which it supplies the ink to said head in response to a reset signal which is received during the time when said pump is stopped and the supply of the ink is ceased.

6. A printer according to claim 5, further comprising a manually operated switch, said reset signal representing a status signal of said manually operated switch.

7. A printer according to claim 5, said solenoid valve assembly comprising switch valve assembly means for establishing a communication between said pump and said ink jet projecting head and interrupting the communication between said pump and said head on the one hand and the waste vessel on the other hand when energized, and for establishing a communication between said head and the waste vessel and interrupting a communication between said head and the waste vessel on one hand and said pump on the other hand when deenergized, said controlling means operating to deenergize said solenoid valve assembly means when the projection of an ink jet is interrupted.

8. A printer according to claim 5, further comprising a sound producing member, said print controller further including means for temporarily energizing said sound producing member when the projection of an ink jet is interrupted.

9. A printer according to claim 5, further comprising a light emitting element, said print controller causing said light emitting element to flash continuously as long as the projection of an ink jet is being interrupted.

10. A printer according to claim 5, said print controller further including standby means for establishing a standby time of a given increased length from the initiation of the projection of an ink jet which occurs immediately after thepower to said printer is turned on and also establishing a standby time of reduced length when the projection of an ink jet is interrupted subsequently, and charging means for initiating an application of a charging voltage to said charging electrode after the standby time has passed.

11. A printer according to claim 5, said print controller further including continuing means for allowing the projection of an ink jet to be continued in response to a given switch condition even though other conditions allow the projection of an ink jet to be interrupted.

12. A printer according to claim 5, said ink receiver comprising:

gutter means mounted on a carriage on which said head is mounted, for capturing ink particles flying on a given track;

ink trap means for capturing ink particles missing said gutter means when the carriage is located at a given position which is out of the printing position; and an ink passage leading to said head, ink recovered by said gutter means being returned to said ink passage and the ink recovered by said ink trap means being returned to a waste vessel.

13. A printer according to claim 12, said ink trap means comprising an opening into which all of the ink particles missing said gutter means can advance and a charged detecting electrode disposed in said opening, said print controller including means for locating the carriage at a given location which is out of the printing position at a given time interval as long as the projection of an ink jet is being continued in order to perform an adjustment of an amount of deflection based on an output from said charge-detecting electrode and to perform a discarding ink projection over a given time interval.

14. A printer comprising:

an ink jet projecting head;

an ink reservoir;

a pump for supplying ink from said ink reservoir to said head;

a solenoid valve assembly disposed between said head and said pump for controlling the supply of ink to said head;

a temperature controller for controlling the temperature of the ink supplied to said head at a given value;

a charging electrode for selectively charging the ink as it is projected from said head;

a pair of deflecting electrodes for developing a deflecting field for application to the charged ink;

an ink receiver for capturing non-printing ink which is projected from said head;

a record paper feeder for maintaining a record paper at a printing position and for feeding the record paper; and a print controller including instructing means for instructing said temperature controller to start, and controlling means for controlling the driving and stopping of said pump, the energizing and deenergizing of said solenoid valve assembly, the application of a charging voltage to said charging electrode, and a feed operation by said record paper feeder, said controlling means being operative to stop said pump and render said solenoid valve assembly in a condition which ceases the supply of the ink to said head when a print control command such as a print command, a line feed command, a page-command or the like is not received over a given time interval, without stopping the control of the temperature of the ink, and to initiate driving said pump and render said solenoid valve assembly in a condition which supplies the ink to said head in response to a reset signal when said pump is stopped and the supply of the ink is ceased.

15. A printer according to claim 14, further comprising a manually operated switch, the reset signal representing a status signal of said manually operated switch.

16. A printer according to claim 14, said solenoid valve assembly comprising switching valve means for establishing a communication between said pump and said ink jet projecting head and interrupting the communication between said pump and said head on one hand and a waste vessel on the other hand when energized, and for establishing a communication between said head and said waste vessel and interrupting a communication between said head and the waste vessel on one hand and said pump on the other hand when deenergized, said controlling means operating to deenergize said solenoid valve assembly means when the projection of an ink jet is interrupted.

17. A printer according to claim 14, further comprising a sound producing member, said print controller further including means for temporarily energizing said sound producing member when the projection of an ink jet is interrupted.

18. A printer according to claim 14, further comprising a light emitting element, said print controller further including means for causing said light emitting element to flash continuously as long as the projection of an ink jet is being interrupted.

19. A printer according to claim 14, said print controller including standby means for establishing a standby time of a given increased length from the initiation of the projection of an ink jet which occurs immediately after the power to said printer is turned on and also establishing a standby time of a reduced length when the projection of an ink jet is interrupted subsequently, and charging means for initiating the application of a charging voltage to said charging electrode after the standby time has passed.

20. A printer according to claim 14, said print controller including continuing means for allowing the projection of an ink jet to be continued in response to a given switch condition even though other conditions allow the projection of an ink jet to be interrupted.

21. A printer according to claim 14, said ink receiver comprising:

gutter means mounted on a carriage on which said head is mounted, for capturing ink particles flying on a given track;

ink trap means for capturing ink particles missing said gutter means when the carriage is located at a given position which is out of the printing position; and an ink passage leading to said head, the ink recovered by said gutter means being returned to said ink passage and the ink recovered by said ink trap means being returned to a waste vessel.

22. A printer according to claim 21, said ink trap means comprising an opening into which all of the ink particles missing said gutter means can advance, and a charge detecting electrode disposed in said opening, said print controller including means for locating the carriage at a given location which is out of the printing position at a given time interval as long as the projection of an ink jet is being continued in order to perform an adjustment of an amount of deflection based on an output from said charge detecting electrode and to perform a discarding ink projection over a given time interval.

* * * * *